US012789767B2

(12) United States Patent
Ripley et al.

(10) Patent No.: US 12,789,767 B2
(45) Date of Patent: Nov. 10, 2026

(54) TRAILER BRAKE CONTROL APPARATUS FOR A VEHICLE TRAIN AND METHODS THEREFOR

(71) Applicant: Bendix Commercial Vehicle Systems LLC, Avon, OH (US)

(72) Inventors: John V. Ripley, Elyria, OH (US); Randy J. Salvatora, Columbia Station, OH (US); Joseph M. Macnamara, Ashland, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 0 days.

(21) Appl. No.: 18/770,737

(22) Filed: Jul. 12, 2024

(65) Prior Publication Data

US 2026/0014968 A1 Jan. 15, 2026

(51) Int. Cl.
*B60T 8/17* (2006.01)
*B60T 13/68* (2006.01)

(52) U.S. Cl.
CPC .......... *B60T 8/1708* (2013.01); *B60T 13/683* (2013.01)

(58) Field of Classification Search
CPC ............................. B60T 8/1708; B60T 13/683
USPC ........................................................... 701/70
See application file for complete search history.

(56) References Cited

U.S. PATENT DOCUMENTS 4,593,954 A * 6/1986 Campanini ........... B60T 13/268 303/7
5,001,639 A * 3/1991 Breen ..................... B60T 17/22 303/123
5,005,130 A * 4/1991 Breen ..................... B60T 8/323 701/72
5,022,714 A * 6/1991 Breen ..................... B60T 8/323 188/112 A
5,029,948 A * 7/1991 Breen ..................... B60T 13/66 188/112 A
5,102,202 A * 4/1992 Breen ....................... B60T 7/20 303/123
5,108,158 A * 4/1992 Breen ..................... B60T 8/323 303/123
5,152,544 A * 10/1992 Dierker, Jr. ........ B62D 53/0871 280/446.1
5,615,929 A * 4/1997 Broome .................. B60T 13/66 303/3
6,225,894 B1 * 5/2001 Kyrtsos ................... B60T 8/243 340/440

(Continued)

*Primary Examiner* — Kurt Philip Liethen
*Assistant Examiner* — John D Bailey
(74) *Attorney, Agent, or Firm* — Brian E. Kondas; Cheryl L. Greenly; Geoffrey A. Kudlo

(57) ABSTRACT

A trailer brake control apparatus is provided for enabling a lead trailer of a vehicle train to provide a selected braking signal for delivery to a rear trailer of the vehicle train. The trailer brake control apparatus comprises a number of pneumatic devices arranged to select one of a plurality of braking signals. The trailer brake control apparatus also comprises a trailer braking controller arranged to (i) receive a first braking signal to apply trailer service brakes of the vehicle train, (ii) produce a second braking signal based upon roll stability activation, and (iii) control the number of pneumatic devices in response to the roll stability activation to select either the first braking signal or the second braking signal for delivery to the rear trailer of the vehicle train.

23 Claims, 15 Drawing Sheets

(56) References Cited

U.S. PATENT DOCUMENTS

| | | | | |
|---|---|---|---|---|
| 8,708,430 | B2 * | 4/2014 | Bensch | B60T 8/361 303/113.4 |
| 9,573,589 | B2 * | 2/2017 | Tagesson | B60W 30/02 |
| 9,598,089 | B2 * | 3/2017 | Tagesson | B60W 10/184 |
| 11,155,253 | B2 * | 10/2021 | Schmidt | B60T 13/662 |
| 11,383,689 | B2 * | 7/2022 | Engelbert | B60T 17/22 |
| 11,752,988 | B2 * | 9/2023 | Van Thiel | B60T 8/171 701/70 |
| 2006/0017317 | A1 * | 1/2006 | Howell | B60T 13/36 303/9.66 |
| 2008/0258542 | A1 * | 10/2008 | Soupal | B60T 8/1708 303/7 |
| 2010/0066161 | A1 * | 3/2010 | Fry | B60T 8/246 303/9.66 |
| 2010/0070149 | A1 * | 3/2010 | Fry | B60T 8/1708 701/70 |
| 2010/0304929 | A1 * | 12/2010 | Hilberer | B60T 8/248 192/220 |
| 2012/0193889 | A1 * | 8/2012 | Harrison | B60T 8/1764 701/79 |
| 2012/0283925 | A1 * | 11/2012 | Barlsen | B60T 17/22 701/70 |
| 2015/0175138 | A1 * | 6/2015 | Stender | B60T 8/17616 303/9.66 |
| 2016/0068144 | A1 * | 3/2016 | Hummel | B60T 8/1708 701/78 |
| 2016/0152222 | A1 * | 6/2016 | Lenz | B60T 13/26 303/127 |
| 2018/0334151 | A1 * | 11/2018 | Eckert | B60T 8/00 |
| 2019/0184950 | A1 * | 6/2019 | Williams | B60T 17/22 |
| 2020/0223414 | A1 * | 7/2020 | Brütt | B60T 13/263 |
| 2021/0070265 | A1 * | 3/2021 | Roether | B60W 10/20 |
| 2021/0197780 | A1 * | 7/2021 | Mueller | B60T 13/268 |
| 2021/0245704 | A1 * | 8/2021 | Ricke | B60W 40/12 |
| 2021/0261110 | A1 * | 8/2021 | Schnittger | B60T 13/266 |
| 2021/0347342 | A1 * | 11/2021 | Van Thiel | B60T 8/171 |
| 2022/0032891 | A1 * | 2/2022 | Amtsfeld | B60T 7/20 |
| 2022/0080939 | A1 * | 3/2022 | Brütt | B60T 13/662 |
| 2022/0185251 | A1 * | 6/2022 | Schmidt | B60T 13/683 |
| 2023/0010827 | A1 * | 1/2023 | van Thiel | B60T 15/027 |
| 2023/0012205 | A1 * | 1/2023 | van Thiel | B60T 13/683 |
| 2023/0087332 | A1 * | 3/2023 | Dieckmann | B60T 8/1755 701/70 |
| 2023/0121191 | A1 * | 4/2023 | Rust | B60L 7/18 701/22 |
| 2023/0134660 | A1 * | 5/2023 | Lewis | B60G 17/01941 267/64.16 |
| 2023/0347855 | A1 * | 11/2023 | Plow | B60T 8/342 |
| 2023/0373456 | A1 * | 11/2023 | Grzeskowiak | B60T 13/26 |
| 2023/0415713 | A1 * | 12/2023 | van Thiel | B60T 7/20 |
| 2024/0001900 | A1 * | 1/2024 | Kirmaier | B60T 11/108 |
| 2024/0017701 | A1 * | 1/2024 | van Thiel | B60T 7/12 |
| 2024/0198985 | A1 * | 6/2024 | Kasper | B60T 8/1708 |
| 2024/0198991 | A1 * | 6/2024 | van Thiel | B60T 8/171 |
| 2024/0317199 | A1 * | 9/2024 | Harrison | B60T 13/683 |
| 2024/0351565 | A1 * | 10/2024 | Brütt | B60T 7/20 |
| 2025/0145124 | A1 * | 5/2025 | Lango | B60T 13/662 |
| 2025/0153695 | A1 * | 5/2025 | Hurley | B60T 13/665 |

* cited by examiner

TRAILER BRAKE CONTROL APPARATUS FOR A VEHICLE TRAIN AND METHODS THEREFOR

BACKGROUND

The present application relates to trailer braking systems, and is particularly directed to a trailer brake control apparatus for a vehicle train and methods therefor, such as for a vehicle train having a tractor that is towing a lead trailer and a rear trailer.

In a typical vehicle train having a tractor towing a lead trailer and a rear trailer, trailer service brakes are applied in response to a request from a driver of the vehicle train to apply the trailer service brakes. In known vehicle trains, trailer service brakes of the lead trailer and trailer service brakes of the rear trailer are applied in response to the request from the driver to apply trailer service brakes. In some known vehicle trains, the trailer service brakes of the lead trailer are also controlled in response to braking signals from a trailer controller to improve braking performance of the vehicle train.

Despite advances already made, those skilled in the art continue with research and development efforts in the field of trailer service braking of a vehicle train.

SUMMARY

In accordance with one embodiment, a trailer brake control apparatus is provided for enabling a lead trailer of a vehicle train to provide a selected braking signal for delivery to a rear trailer of the vehicle train. The trailer brake control apparatus comprises a number of pneumatic devices arranged to select one of a plurality of braking signals. The trailer brake control apparatus also comprises a trailer braking controller arranged to (i) receive a first braking signal to apply trailer service brakes of the vehicle train, (ii) produce a second braking signal based upon roll stability activation, and (iii) control the number of pneumatic devices in response to the roll stability activation to select either the first braking signal or the second braking signal for delivery to the rear trailer of the vehicle train.

In accordance with another embodiment, a trailer brake control apparatus is provided for enabling a lead trailer of a vehicle train to provide a selected braking signal for delivery to a rear trailer of the vehicle train. The trailer brake control apparatus comprises a number of pneumatic devices arranged to select one of a plurality of braking signals. The trailer brake control apparatus also comprises a trailer braking controller arranged to (i) receive an applied braking signal to apply trailer service brakes of the vehicle train, (ii) produce a left-roll stability braking signal and a right-roll stability braking signal based upon the applied braking signal received, and (iii) control the number of pneumatic devices in response to a roll stability event occurring to select one of the applied braking signal, the left-roll stability braking signal, and the right-roll stability braking signal for delivery to the rear trailer of the vehicle train.

In accordance with yet another embodiment, a method is provided of operating a trailer braking system of a lead trailer of a vehicle train having a rear trailer towed by the lead trailer. The method comprises receiving a first braking signal to apply trailer service brakes of the vehicle train. The method also comprises producing a second braking signal in response to a roll stability event occurring with the vehicle train. The method further comprises selecting one of the first and second braking signals for delivery to the rear trailer based upon the roll stability event occurring with the vehicle train.

DETAILED DESCRIPTION

The present application is directed to a trailer brake control apparatus for a vehicle train and methods therefor, such as for a vehicle train having a tractor towing a lead trailer and a rear trailer. The specific construction of the trailer brake control apparatus may vary. It is to be understood that the disclosure below provides a number of embodiments or examples for implementing different features of various embodiments. Specific examples of components and arrangements are described to simplify the present disclosure. These are merely examples and are not intended to be limiting.

Figure 1:
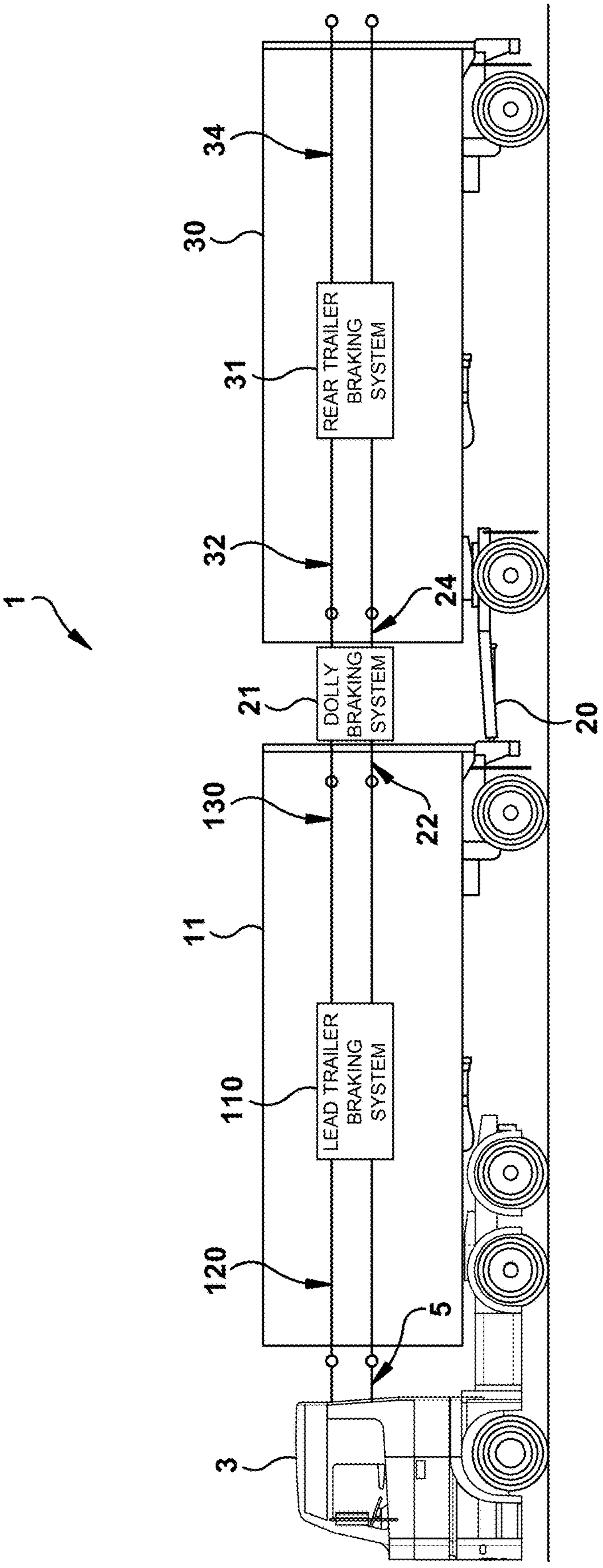
FIG. 1 (Prior Art)
FIG. 1 is a pictorial diagram of a lead trailer of a vehicle train embodying a prior art trailer braking system.

Referring to FIG. 1, a pictorial diagram is illustrated of lead trailer 11 of vehicle train 1 embodying a prior art trailer braking system 110. Vehicle train 1 includes tractor 3 that is towing lead trailer 11, dolly converter 20, and rear trailer 30. Lead trailer 11 has lead trailer braking system 110, dolly converter 20 has dolly braking system 21, and rear trailer 30 has rear trailer braking system 31. Lead trailer 11 has front gladhands 120 that are connected with gladhands 5 of tractor 3, and rear gladhands 130 that are connected with front gladhands 22 of dolly converter 20. Similarly, rear trailer 30 has front gladhands 32 that are connected with rear gladhands 24 of dolly converter 20, and rear gladhands 34 that are connectable to another dolly converter (not shown).

Structure and operation of gladhands of vehicle train 1 are known and conventional and, therefore, will not be described.

Figure 1A:
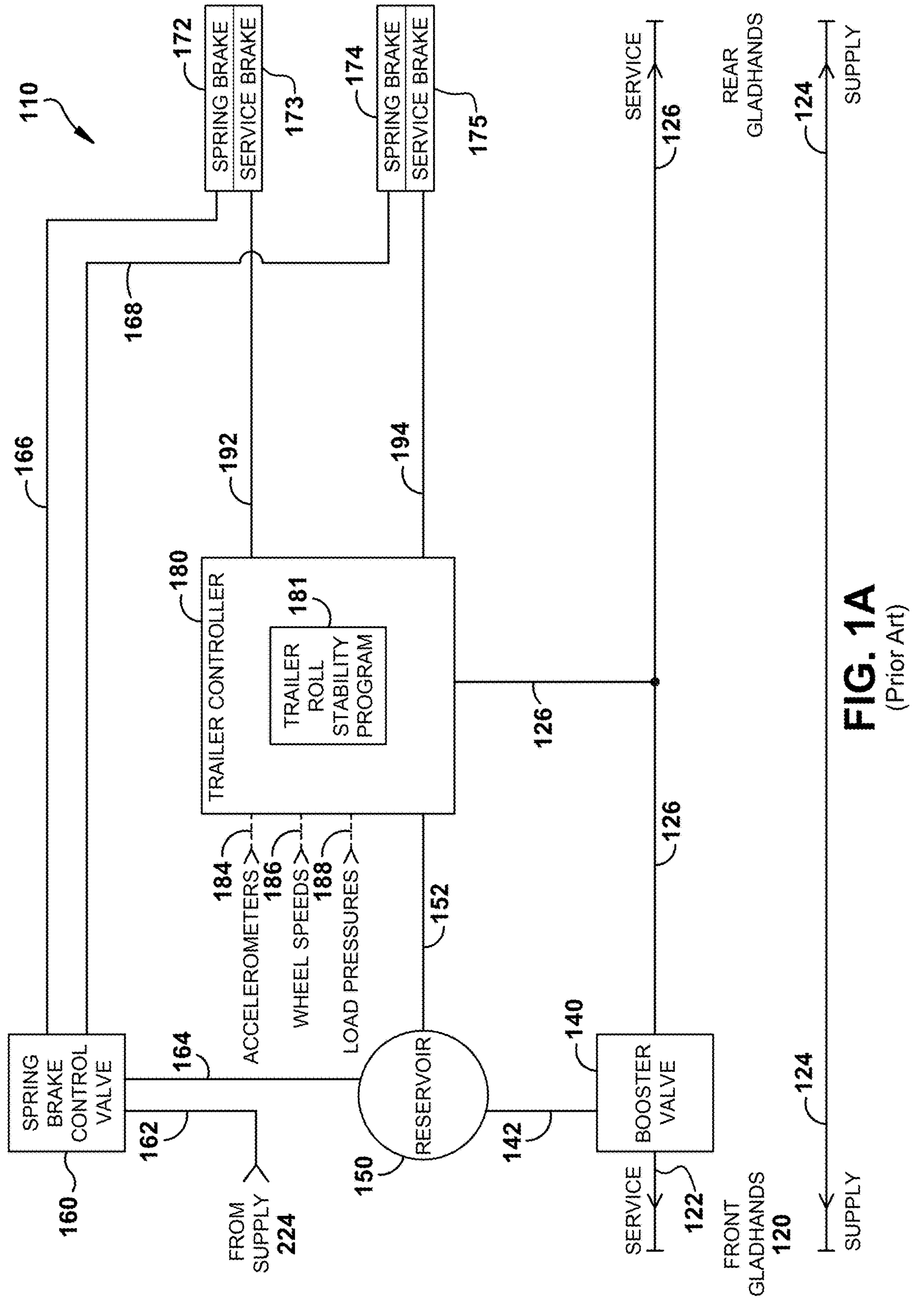
FIG. 1A (Prior Art)
FIG. 1A is a schematic block diagram of the prior art trailer braking system of FIG. 1.

Referring to FIG. 1A, a schematic block diagram is illustrated of the prior art trailer braking system 110 of FIG. 1. In FIG. 1A, pneumatic line connections are shown as solid lines, and electrical line connections are shown as dashed lines.

As shown in FIG. 1A, front gladhands 120 comprise the air pressure in service line 122 and the air pressure in supply line 124. Booster valve 140 receives pressurized air in line 142 from air reservoir 150 to boost the air pressure in service line 122, which boosted air pressure is delivered in line 126. Rear gladhands 130 comprise the boosted air pressure in line 126 and the air pressure in supply line 124.

Spring brake control valve 160 receives pressurized air in line 162 from supply line 124 and delivers pressurized air in line 164 to air reservoir 150, and two pneumatic signals in lines 166, 168 to right-spring brake chamber 172 and left-spring brake chamber 174, respectively, of trailer braking system 110. Trailer controller 180 monitors the pressure in line 152 from air reservoir 150, the boosted air pressure in line 126 from booster valve 140, sensor signal on line 184 from one or more external accelerometers, sensor signal on line 186 from one or more wheel-speed sensors, and sensor signal on line 188 from one or more external load pressure sensors indicative of physical loading on lead trailer 11.

Although the above description describes the one or more accelerometers and the one or more load pressure sensors as being external to trailer braking system 110, it is conceivable that the sensors be internal to trailer braking system 110 or be estimated values based upon other existing sensors. For example, physical loading on lead trailer 11 may be estimated based upon a combination of the sensor signal on line 186 from one or more wheel-speed sensors and signal on line 126 from booster valve 140.

Trailer controller 180 employs trailer roll stability program 181 to provide two pneumatic signals on lines 192, 194 to control right- and left-service brake chambers 173, 175, respectively, in a manner to reduce potential of a vehicle rollover. An example trailer roll stability program 181 is model number TABS-6 Advanced MultiChannel (MC), commercially available from Bendix Commercial Vehicle Systems LLC, located in Avon, Ohio.

Figure 2:
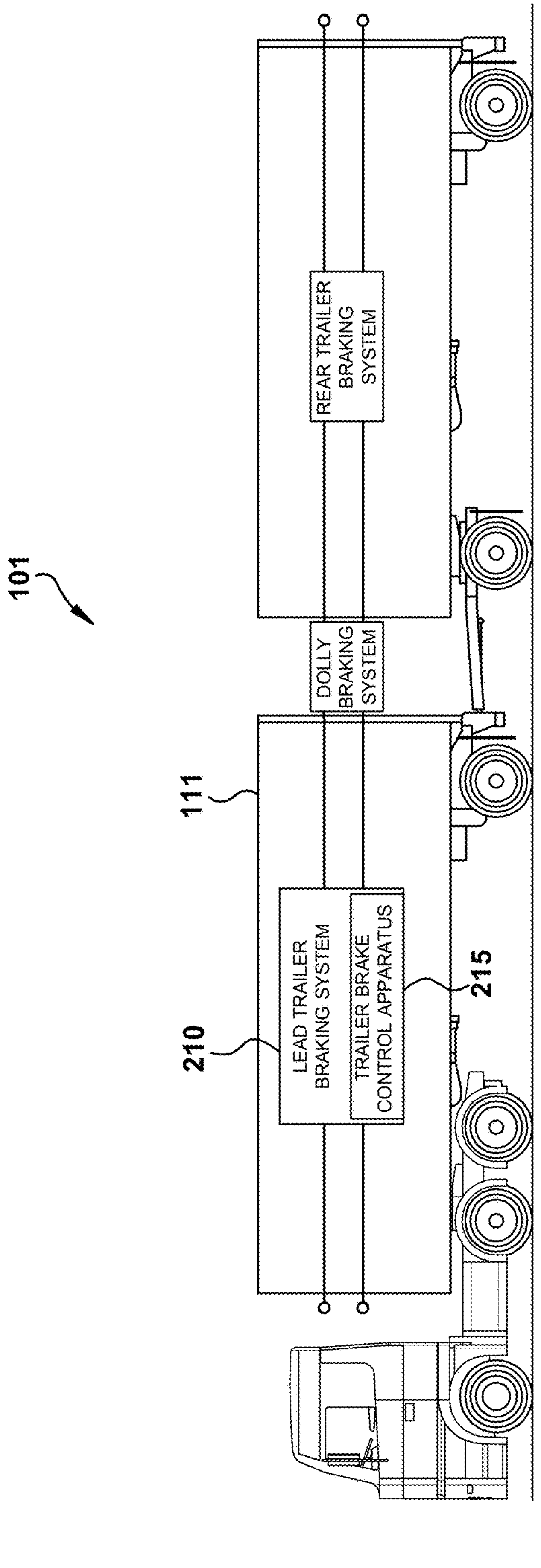
FIG. 2 is similar to FIG. 1, and showing a pictorial diagram of a lead trailer of a vehicle train embodying an example trailer braking system in accordance with the present disclosure.
Figure 2A:
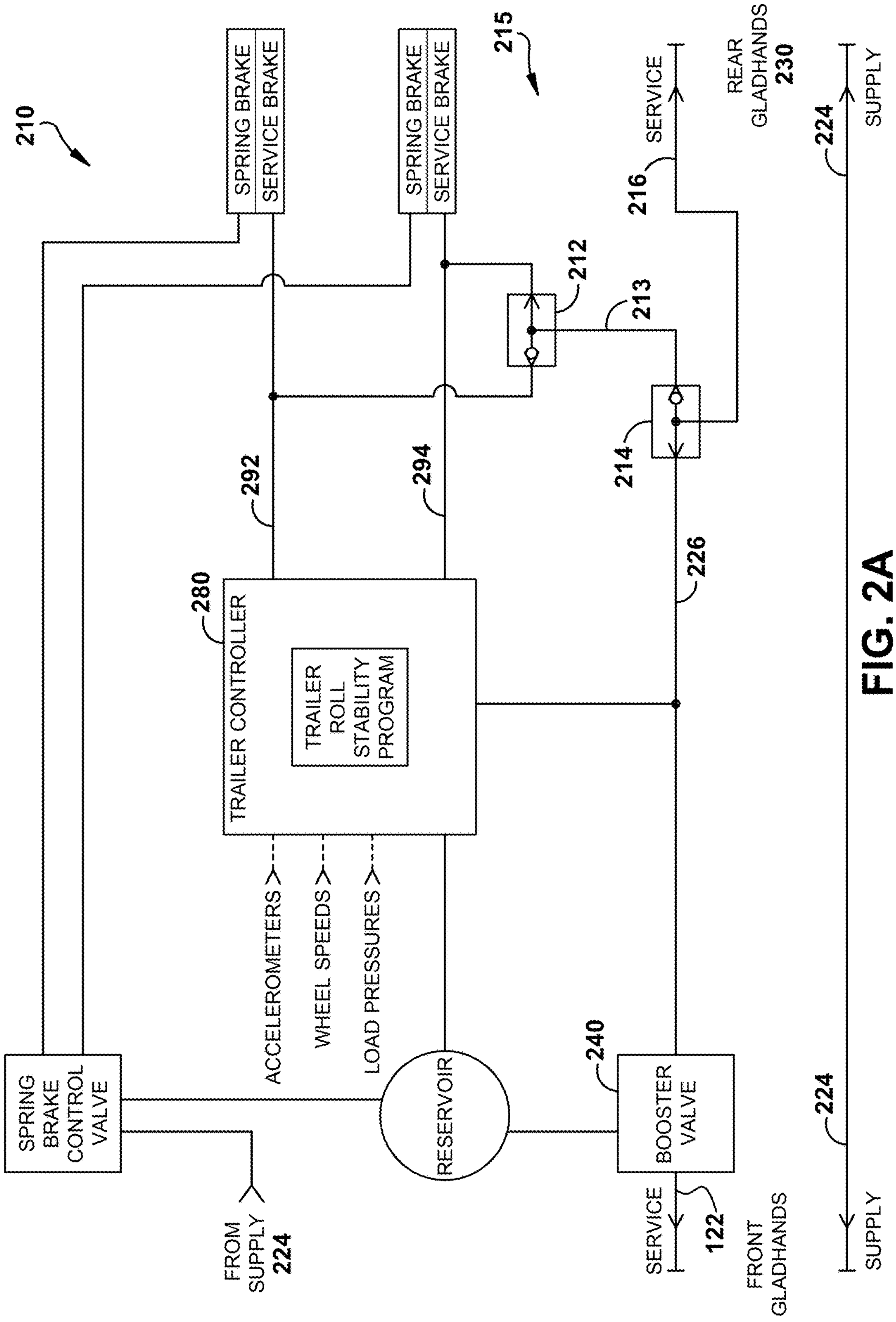
FIG. 2A is similar to FIG. 1A, and showing a schematic block diagram of the trailer braking system of FIG. 2 embodying an example trailer brake control apparatus in accordance with the present disclosure.

Referring to FIG. 2, a pictorial diagram is illustrated of lead trailer 111 of vehicle train 101 embodying an example trailer braking system 210 in accordance with the present disclosure. FIG. 2A is similar to FIG. 1A, and shows a schematic block diagram of trailer braking system 210 embodying an example trailer brake control apparatus 215 in accordance with the present disclosure. Trailer braking system 210 shown in FIG. 2A is similar to trailer braking system 110 shown in FIG. 1A. As such, like components are illustrated in FIG. 2A with like reference numerals 100 higher than shown in FIG. 1A.

As shown in FIG. 2A, trailer brake control apparatus 215 comprises a pair of shuttle valves 212, 214 cooperating together to select one of three braking signals. First braking signal is on line 226 from booster valve 240, second braking signal is on line 292 from trailer controller 280, and a third braking signal is on line 294 from trailer controller 280. Structure and operation of shuttle valves are known and conventional and, therefore, will not be described.

Shuttle valve 212 has one inlet port connected to line 292, the other inlet port connected to line 294, and outlet port connected to line 213. Shuttle valve 214 has one inlet port connected to line 213 from shuttle valve 212, the other inlet port connected to line 226 from booster valve 240, and outlet port connected to line 216. Line 216 and line 224 comprise rear gladhands 230 of lead trailer 111 (FIG. 2).

Shuttle valve 214 is in the position shown in FIG. 2A when the pressure in line 226 is greater than the pressure in line 213. Also, shuttle valve 212 is in the position shown in FIG. 2A when the pressure in line 294 is greater than the pressure in line 292. In the positions of shuttle valves 212, 214 shown in FIG. 2A, the pressure in line 226 is delivered to line 216 of rear gladhands 230.

Figure 2B:
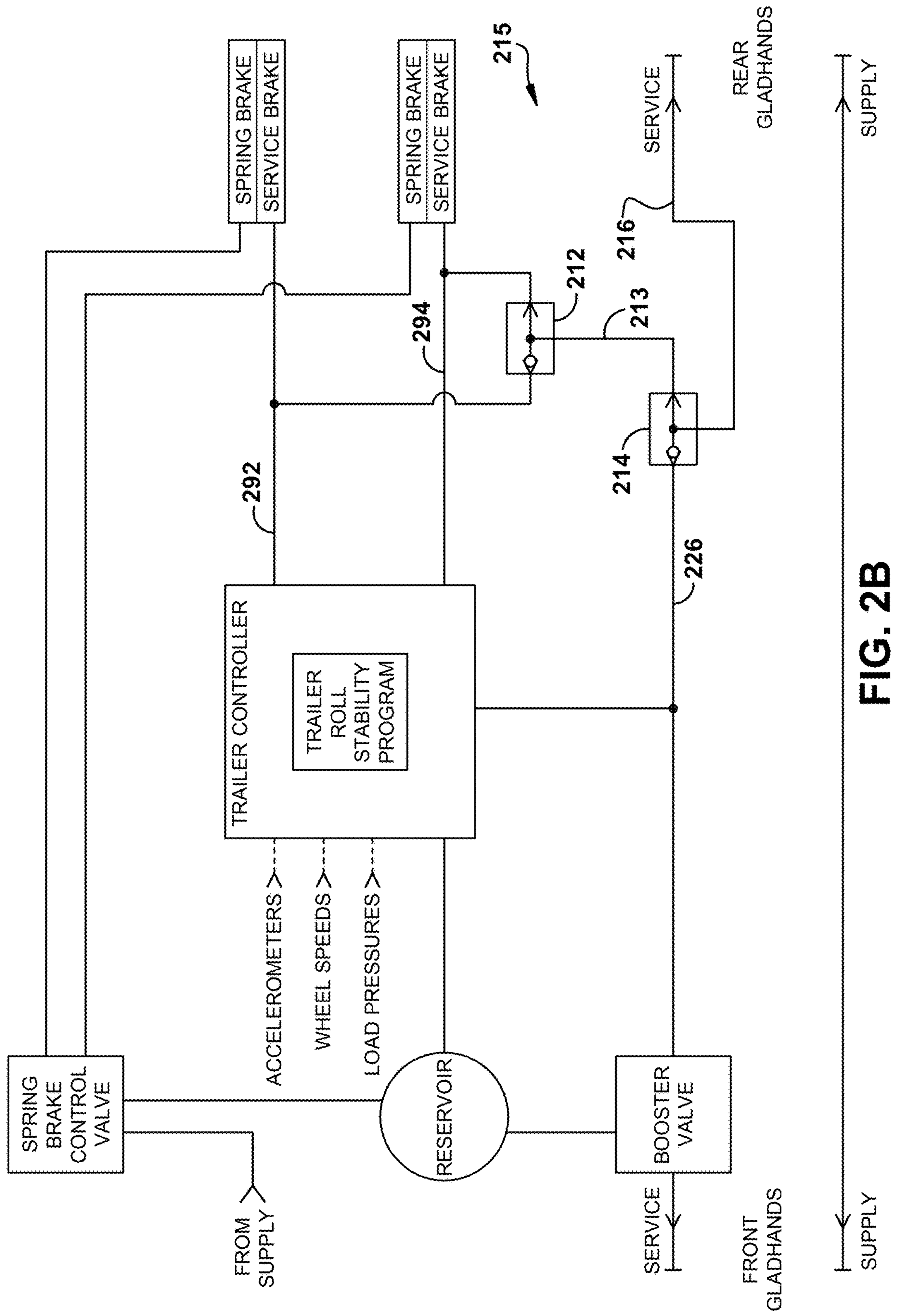
FIGS. 2B and 2C are similar to FIG. 2A, and showing parts in different positions.

However, shuttle valve 214 of trailer brake control apparatus 215 is in the position shown in FIG. 2B when the pressure in line 213 is greater than the pressure in line 226. The pressure in line 213 depends upon which position shuttle valve 212 is in Shuttle valve 212 is in the position shown in FIG. 2B when the pressure in line 294 is greater than the pressure in line 292. In the positions of shuttle valves 212, 214 shown in FIG. 2B, the pressure in line 294 is delivered to line 216 of rear gladhands 230.

Figure 2C:
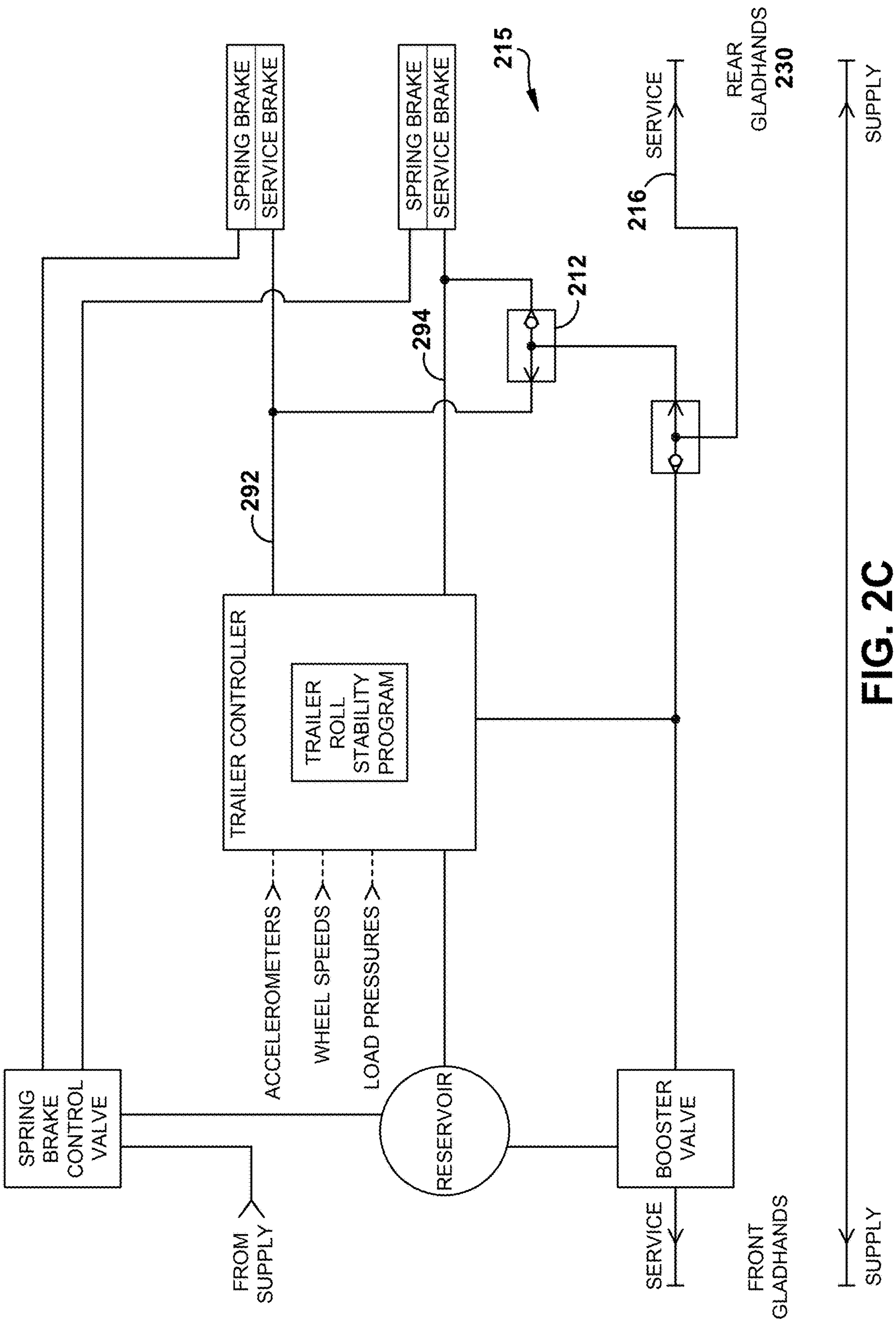

However, shuttle valve 212 of trailer brake control apparatus 215 is in the position shown in FIG. 2C when the pressure in line 292 is greater than the pressure in line 294. In the positions of shuttle valves 212, 214 shown in FIG. 2C, the pressure in line 292 is delivered to line 216 of rear gladhands 230.

Figure 2D:
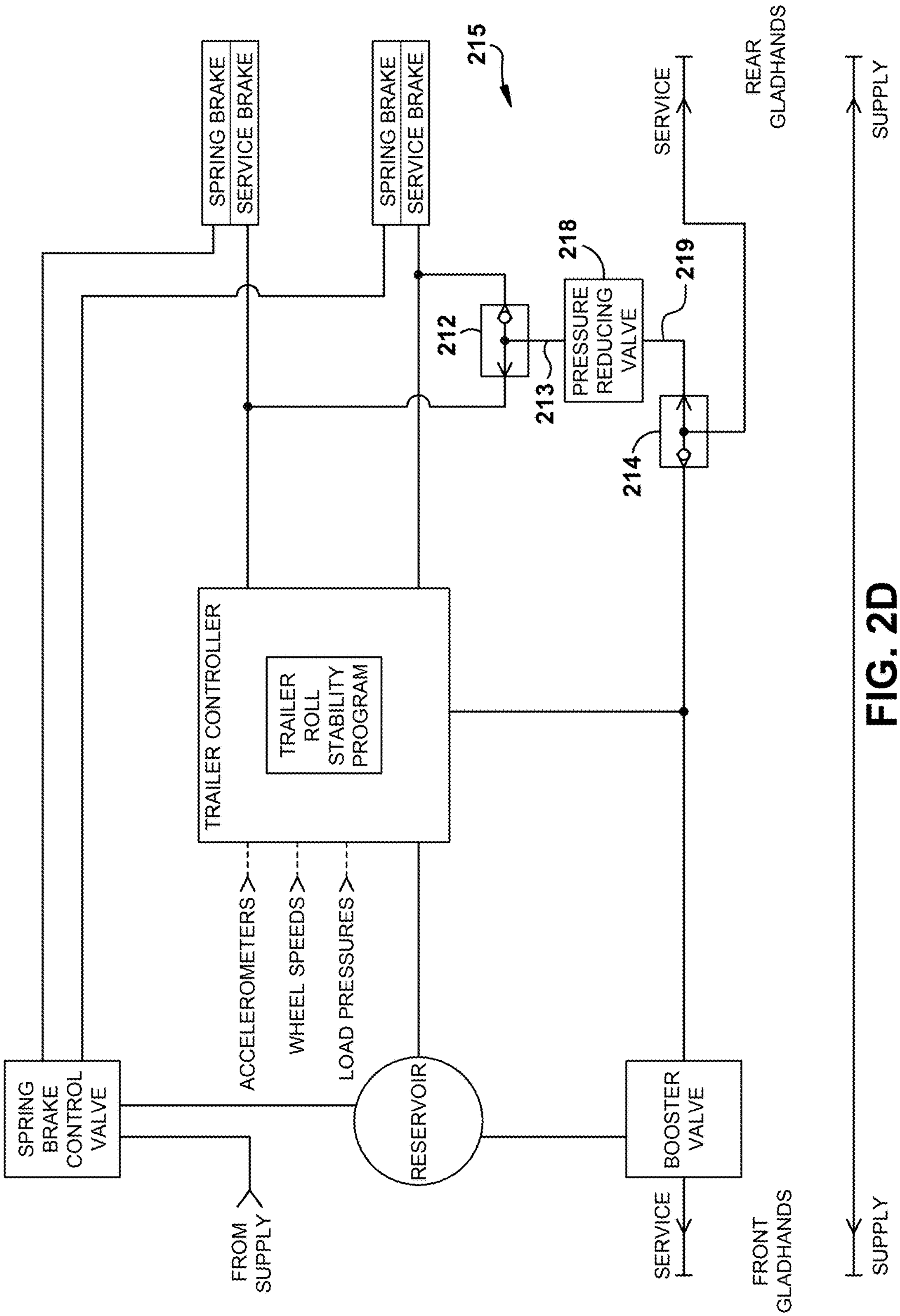
FIG. 2D is similar to FIG. 2C, and showing an added pressure-reducing valve.

As shown in FIG. 2D, a variation of trailer brake control apparatus 215 of FIG. 2C is illustrated. In FIG. 2D, pressure-reducing valve 218 is connected in line 213 between outlet port of shuttle valve 212 and inlet port of shuttle valve 214. Pressure-reducing valve 218 reduces the pressure in line 213 from shuttle valve 212 to shuttle valve 214 on line 219. Structure and operation of pressure-reducing valves are known and conventional and, therefore, will not be described.

Figure 3A:
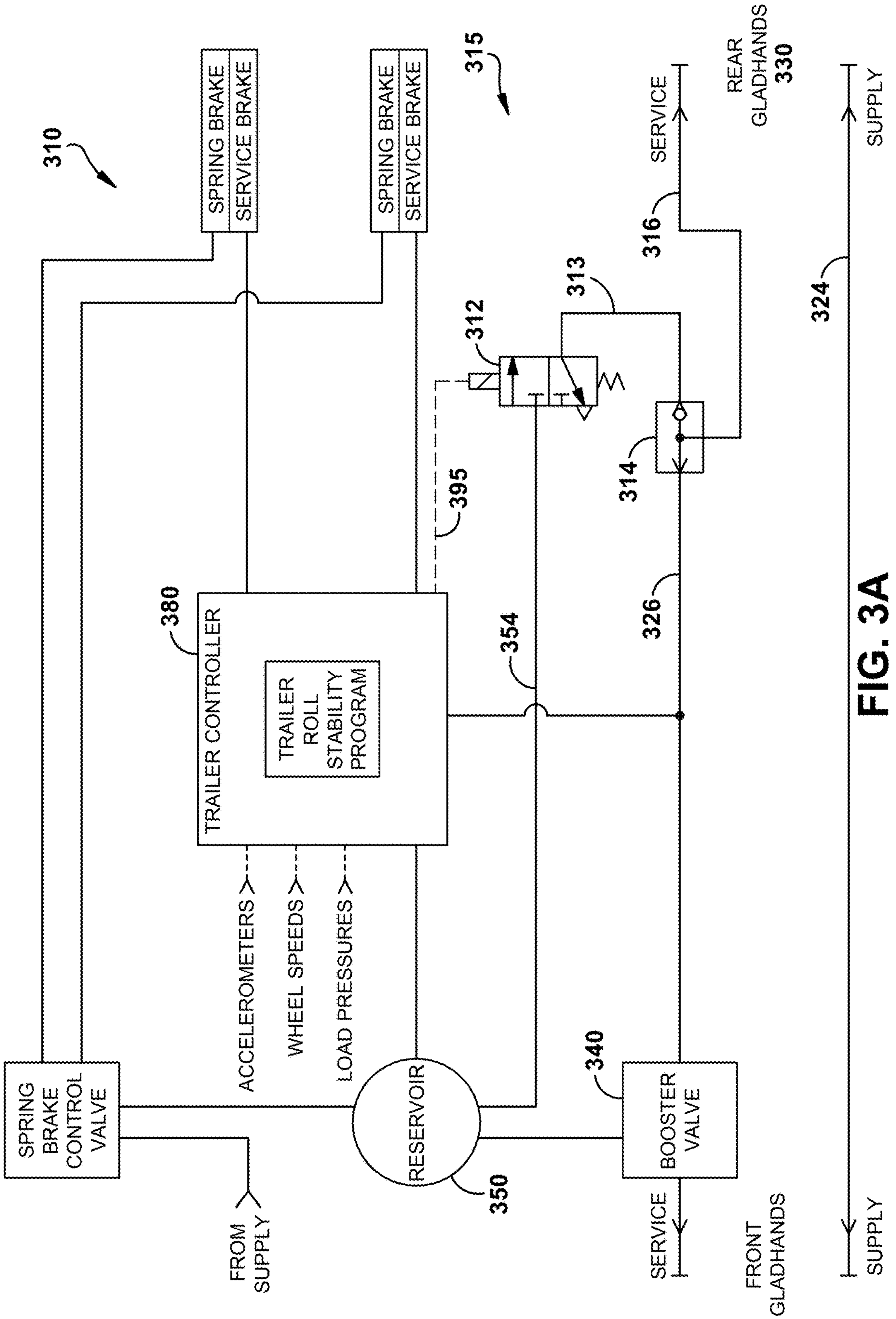
FIG. 3A is similar to FIG. 2A, and showing a schematic block diagram of the trailer braking system of FIG. 2 embodying another example trailer brake control apparatus in accordance with the present disclosure.

Referring to FIG. 3A, another example trailer brake control apparatus 315 in accordance with the present disclosure is illustrated. FIG. 3A is similar to FIG. 2A, and shows a schematic block diagram of trailer braking system 310 embodying another example trailer brake control apparatus 315 in accordance with the present disclosure. Trailer braking system 310 is similar to trailer braking system 210 shown in FIG. 2A. As such, like components are illustrated in FIG. 3A with like reference numerals 100 higher than shown in FIG. 2A.

As shown in FIG. 3A, trailer brake control apparatus 315 comprises solenoid 312 and a shuttle valve 314 cooperating together to select one of two braking signals. First braking signal is on line 326 from booster valve 340, and a second braking signal is on line 354 from air reservoir 350. Structure and operation of solenoids and shuttle valves are known and conventional and, therefore, will not be described.

Solenoid 312 is a 3/2 (i.e., 3-port/2-position) solenoid that is controlled by trailer controller 380 via line 395. Shuttle valve 314 has one inlet port connected via line 313 to solenoid 312, the other inlet port connected to line 326 from booster valve 340, and outlet port connected to line 316. Line 316 and line 324 comprise rear gladhands 330 of lead trailer 111 (FIG. 2).

Solenoid 312 is in the position shown in FIG. 3A when not energized by signal on line 395 from trailer controller 380. The pressure in line 354 from air reservoir is not connected to line 313. Accordingly, in the positions of solenoid 312 and shuttle valve 314 shown in FIG. 3A, the pressure in line 326 is delivered to line 316 of rear gladhands 330.

Figure 3B:
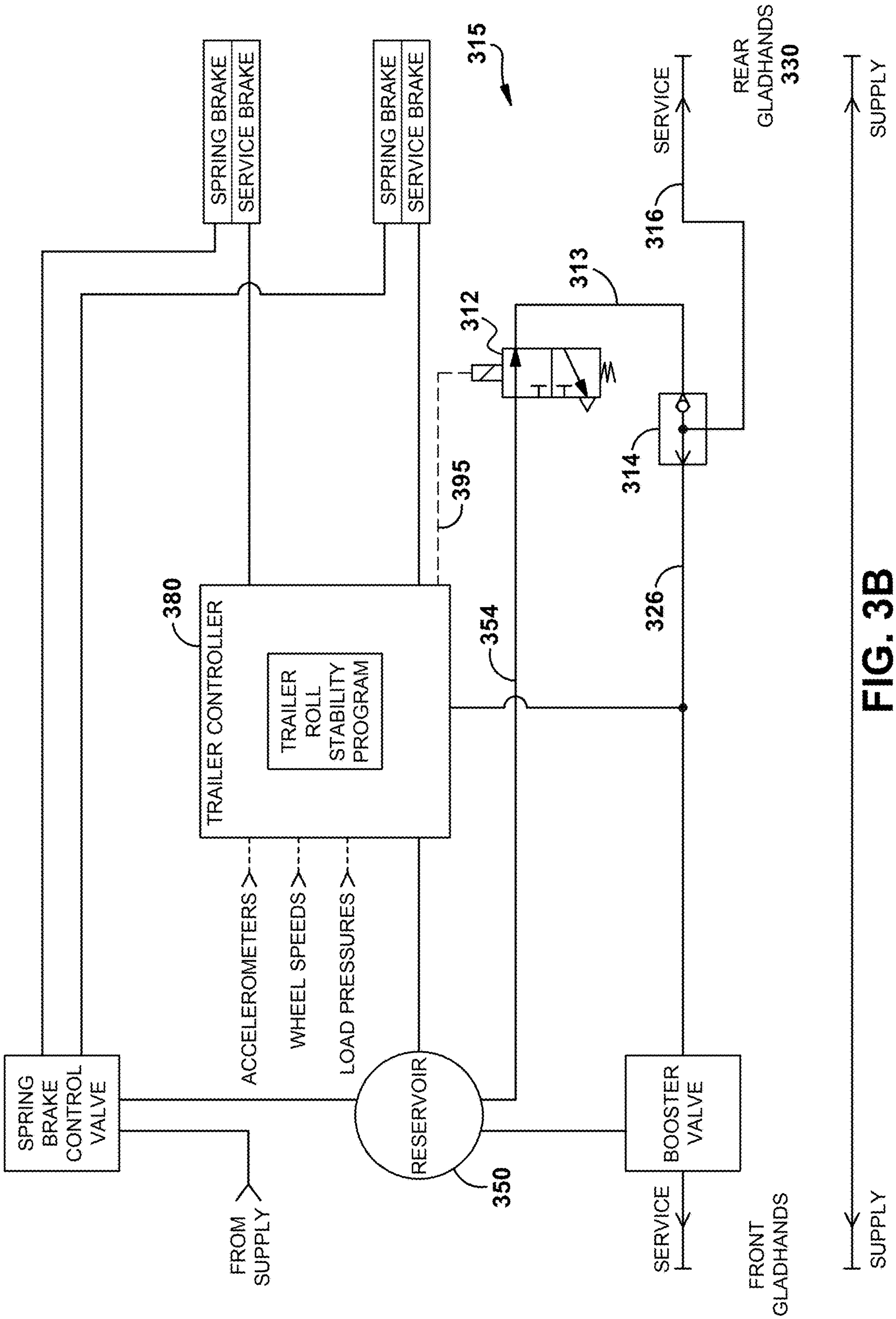
FIGS. 3B and 3C are similar to FIG. 3A, and showing parts in different positions.

Solenoid 312 of trailer brake control apparatus 315 is in the position shown in FIG. 3B when energized by signal on line 395 from trailer controller 380. The pressure in line 354 from air reservoir 350 is connected to line 313. Shuttle valve 314 is in the position shown in FIG. 3B when the pressure in line 326 is greater than the pressure in line 313. Accordingly, in the positions of solenoid 312 and shuttle valve 314 shown in FIG. 3B, the pressure in line 326 is delivered to line 316 of rear gladhands 330.

Figure 3C:
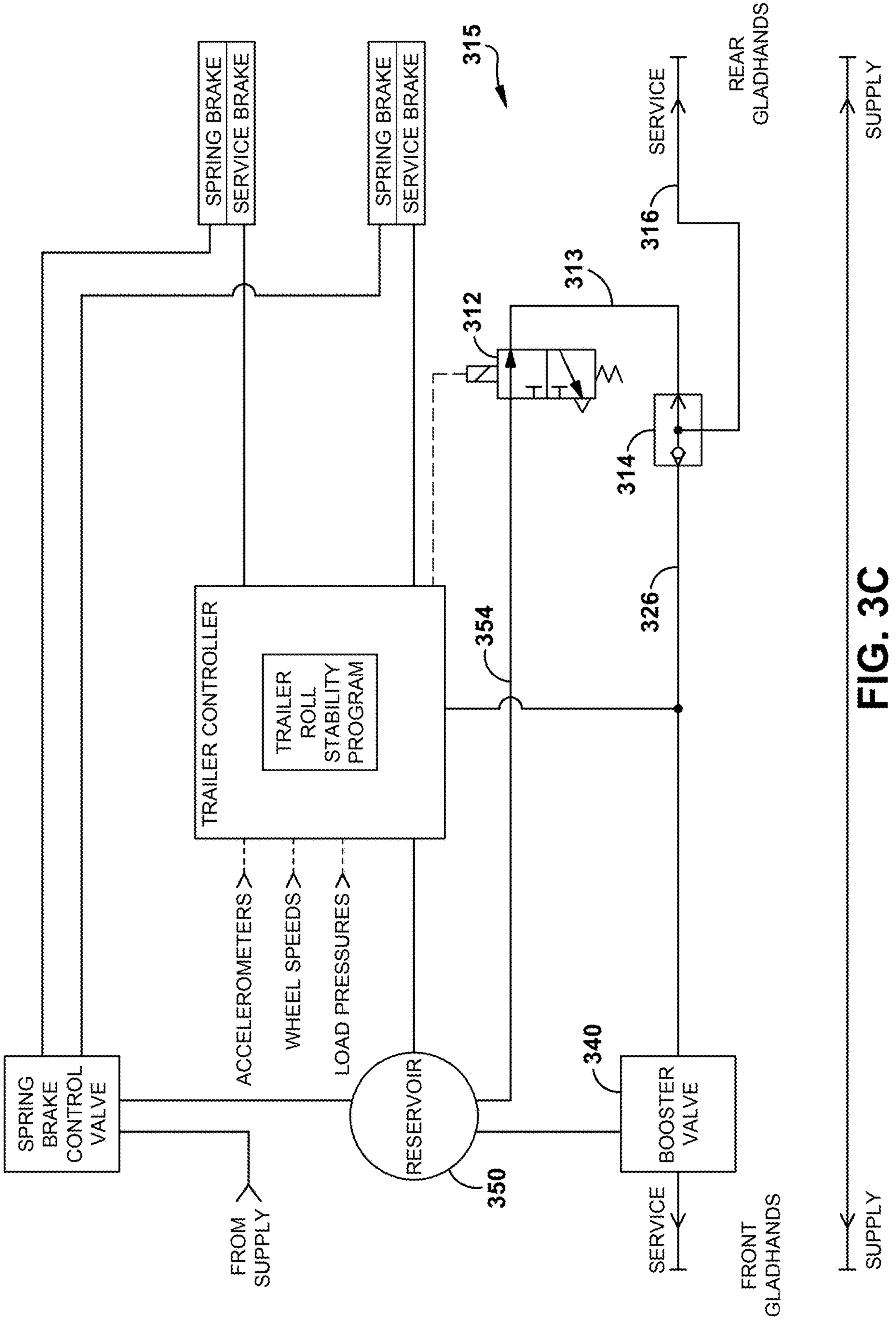

However, when the pressure in line 313 is greater than the pressure in line 326 (i.e., the pressure in line 354 from air reservoir 350 is greater than the pressure in line 326 from booster valve 340), shuttle valve 314 is in the position shown in FIG. 3C. In the positions of solenoid 312 and shuttle valve 314 shown in FIG. 3C, the pressure in line 354 from air reservoir 350 is delivered to line 316 of rear gladhands 330.

Figure 3D:
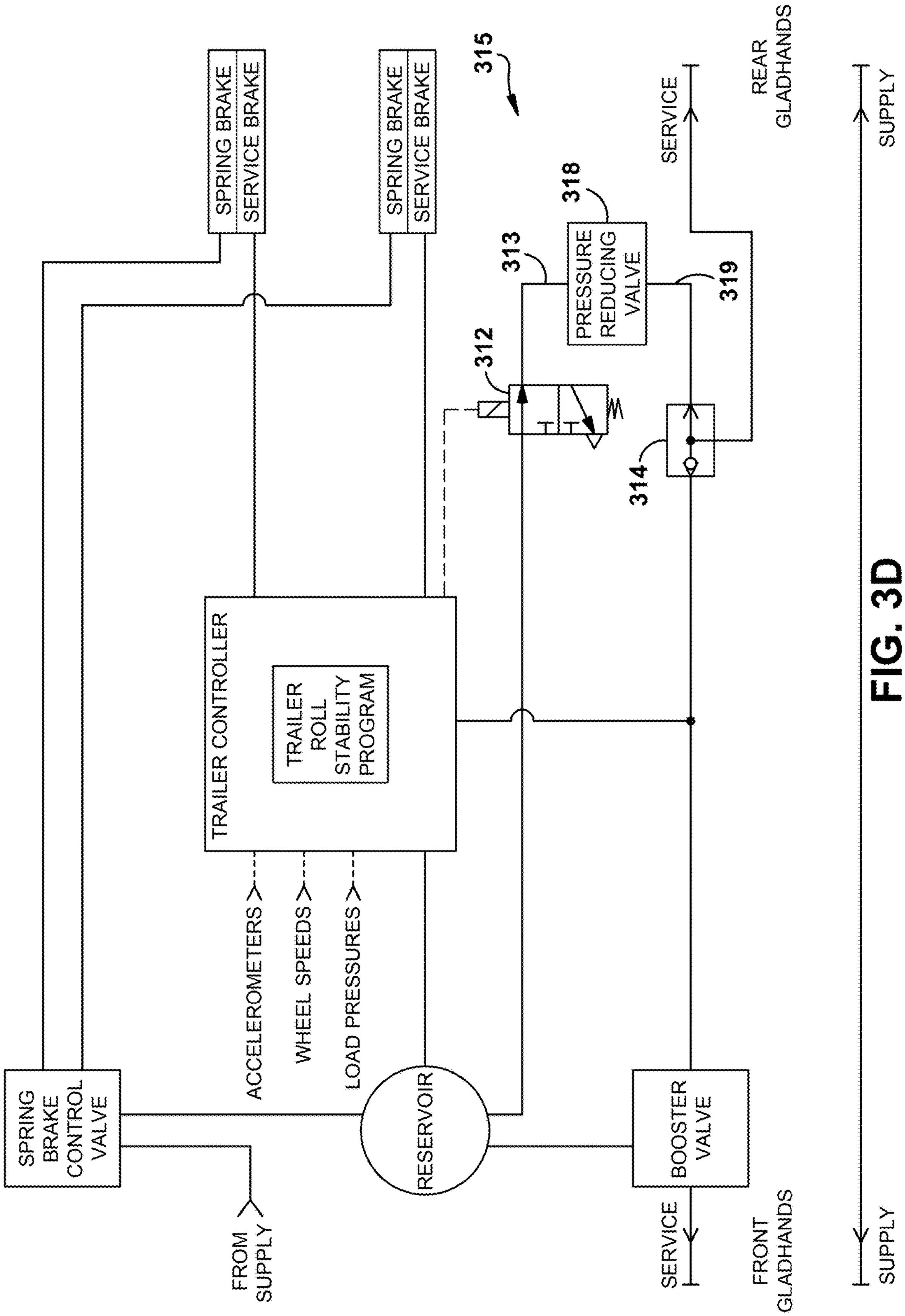
FIG. 3D is similar to FIG. 3C, and showing an added pressure-reducing valve.

As shown in FIG. 3D, a variation of trailer brake control apparatus 315 of FIG. 3C is illustrated. In FIG. 3D, pressure-reducing valve 318 is connected in line 313 between solenoid 312 and shuttle valve 314. Pressure-reducing valve 318 reduces the pressure in line 313 from solenoid 312 to shuttle valve 314 on line 319.

Figure 4A:
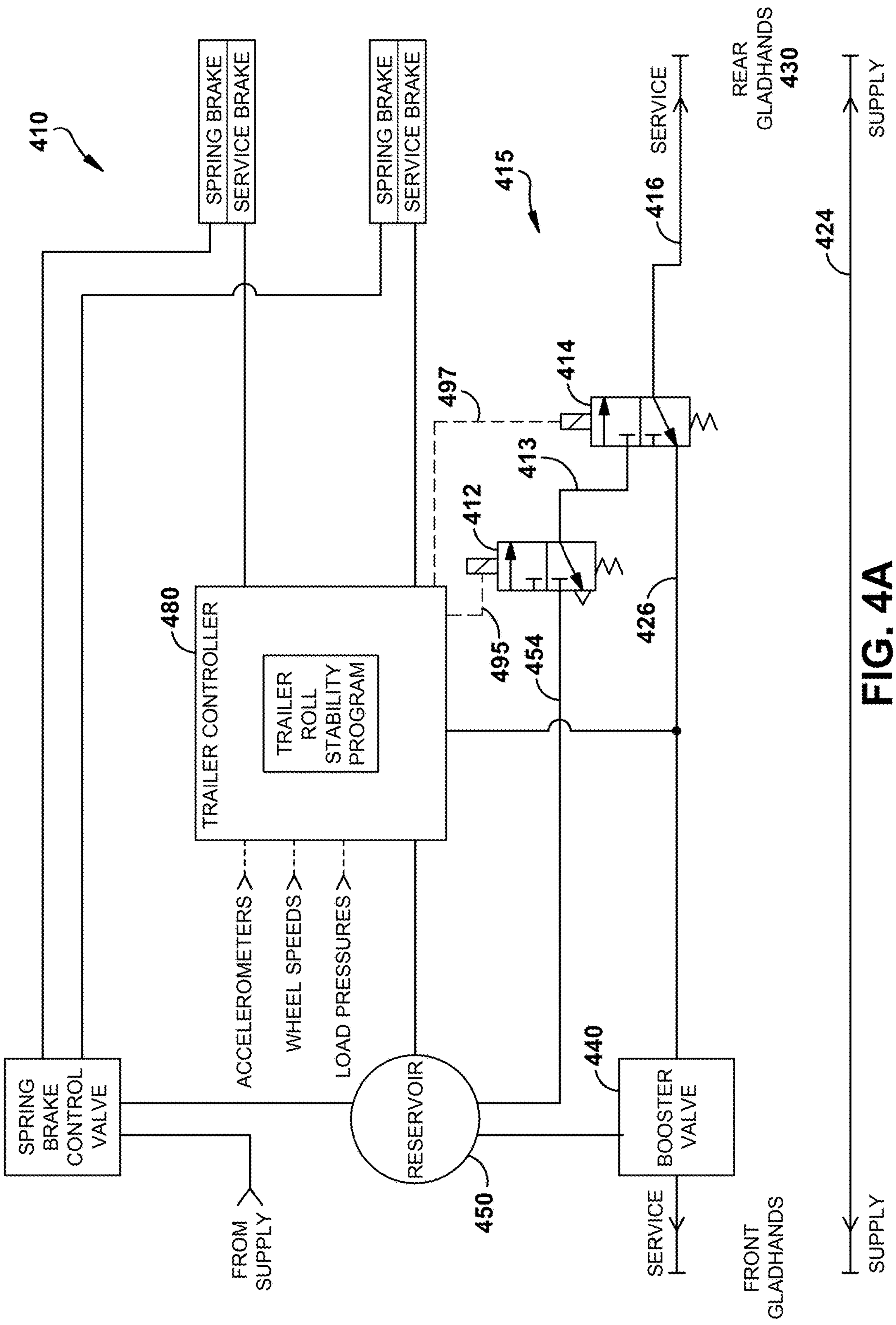
FIG. 4A is similar to FIG. 3A, and showing a schematic block diagram of the trailer braking system of FIG. 2 embodying another example trailer brake control apparatus in accordance with the present disclosure.

Referring to FIG. 4A, another example trailer brake control apparatus 415 in accordance with the present disclosure is illustrated. FIG. 4A is similar to FIG. 3A, and shows a schematic block diagram of trailer braking system 410 embodying another example trailer brake control apparatus 415 in accordance with the present disclosure. Trailer braking system 410 is similar to trailer braking system 310 shown in FIG. 3A. As such, like components are illustrated in FIG. 4A with like reference numerals 100 higher than shown in FIG. 3A.

As shown in FIG. 4A, trailer brake control apparatus 415 comprises a pair of solenoids 412, 414 cooperating together to select one of two braking signals. First braking signal is on line 426 from booster valve 440, and a second braking signal is on line 454 from air reservoir 450. Structure and operation of solenoids and shuttle valves are known and conventional and, therefore, will not be described.

Each of solenoids 412, 414 is a 3/2 (i.e., 3-port/2-position) solenoid that is controlled by trailer controller 480 via lines 495, 497, respectively. Line 454 from air reservoir 450 is connected to solenoid 412, line 413 is connected between solenoid 412 and solenoid 414, and line 426 and line 416 are connected to solenoid 414, as shown in FIG. 4A. Line 416 and line 424 comprise rear gladhands 430 of lead trailer 111 (FIG. 2).

Solenoid 412 is in the position shown in FIG. 4A when not energized by signal on line 495 from trailer controller 480. The pressure in line 454 from air reservoir 450 is not connected to line 413. Also, solenoid 414 is in the position shown in FIG. 4A when not energized by signal on line 497 from trailer controller 480. The pressure in line 426 is connected to line 416. Accordingly, in the positions of solenoid 412 and solenoid 414 shown in FIG. 4A, the pressure in line 426 is delivered to line 416 of rear gladhands 430.

Figure 4B:
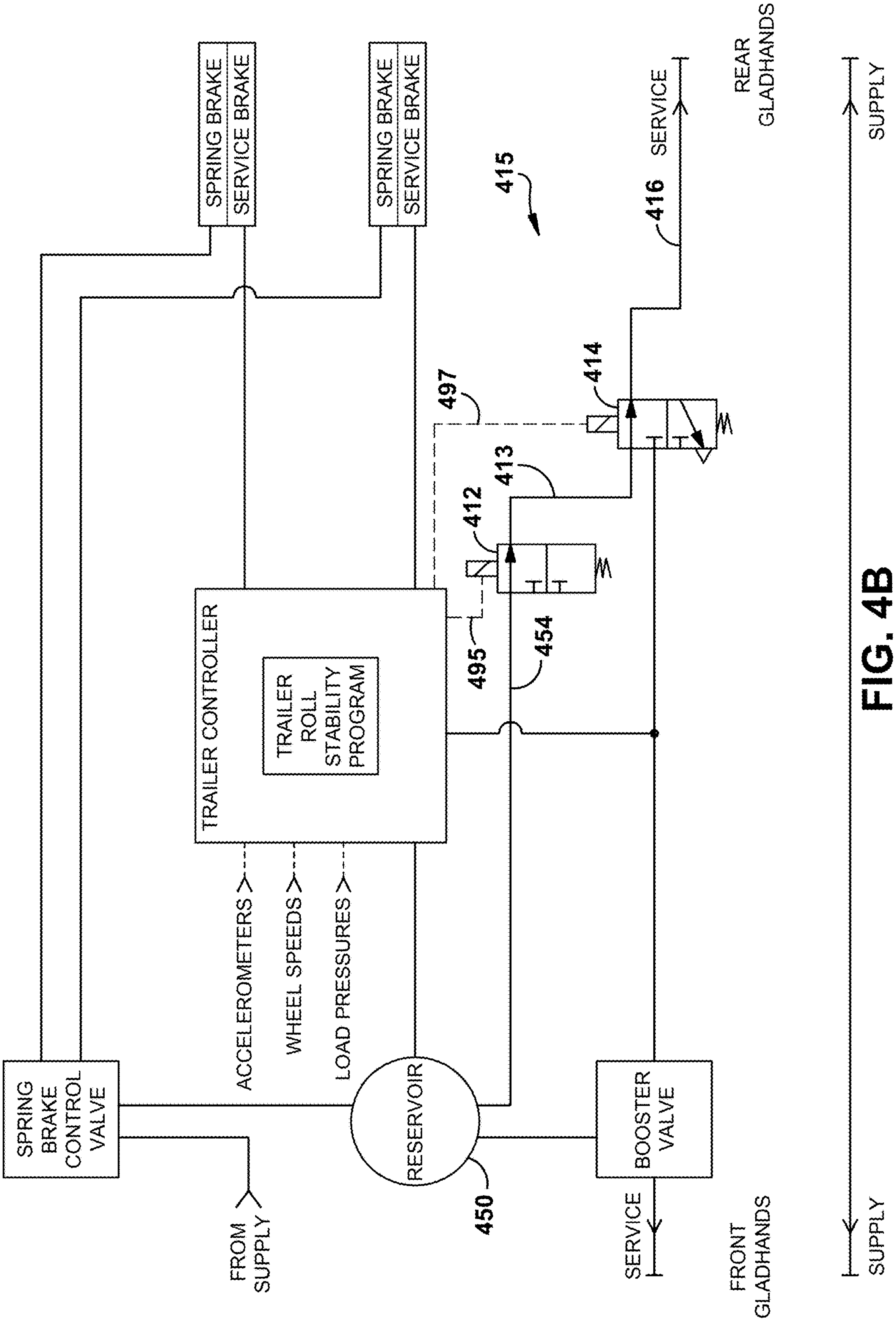
FIG. 4B is similar to FIG. 4A, and showing parts in different positions.

Solenoid 412 is in the position shown in FIG. 4B when energized by signal on line 495 from trailer controller 480. The pressure in line 454 from air reservoir 450 is connected to line 413. Also, solenoid 414 is in the position shown in FIG. 4B when energized by signal on line 497 from trailer controller 480. The pressure in line 426 is not connected to line 416. Accordingly, in the positions of solenoid 412 and solenoid 414 shown in FIG. 4B, the pressure in line 454 from air reservoir 450 is delivered to line 416 of rear gladhands 430.

Figure 4C:
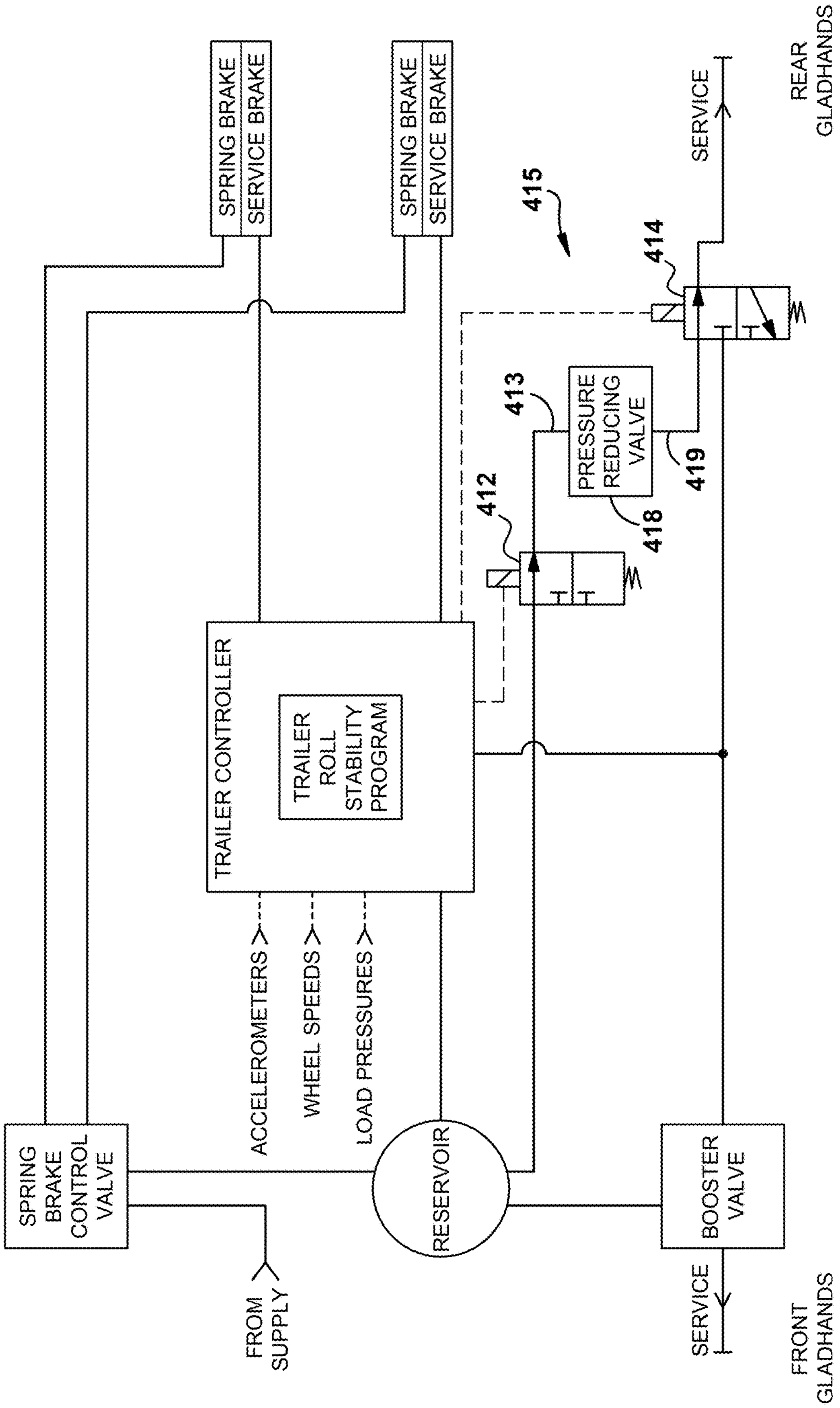
FIG. 4C is similar to FIG. 4B, and showing an added pressure-reducing valve.

As shown in FIG. 4C, a variation of trailer brake control apparatus 415 of FIG. 4B is illustrated. In FIG. 4C, pressure-reducing valve 418 is connected in line 413 between solenoid 412 and solenoid 414. Pressure-reducing valve 418 reduces the pressure in line 413 from solenoid 412 to solenoid 414 on line 419.

It should be apparent that a number of pneumatic devices are provided in a lead trailer of a vehicle train to select one of a plurality of braking signals to be delivered to a rear trailer of the vehicle train. As an example implementation, the number of pneumatic devices may comprise a pair of shuttle valves, a pair of solenoids, or a shuttle valve and a solenoid, as disclosed herein. A trailer braking controller is arranged to (i) receive a first braking signal to apply trailer service brakes, (ii) produce at least another braking signal (i.e., at least a second braking signal) based upon roll stability activation, and (iii) control the number of pneumatic devices in response to the roll stability activation to select either the first braking signal or the second braking signal for delivery to the rear trailer of the vehicle train.

It should also be apparent that the trailer controller is responsive to a request from a driver to apply trailer service brakes of the vehicle train to provide pneumatic control signals. The trailer controller is also responsive to a roll stability event to provide both pneumatic control signals and electrical control signals. The combination of pneumatic control signals and electrical control signals are used to control the number of pneumatic devices and thereby to select the one of the plurality of braking signals for delivery to the rear trailer of the vehicle train.

Figure 5:
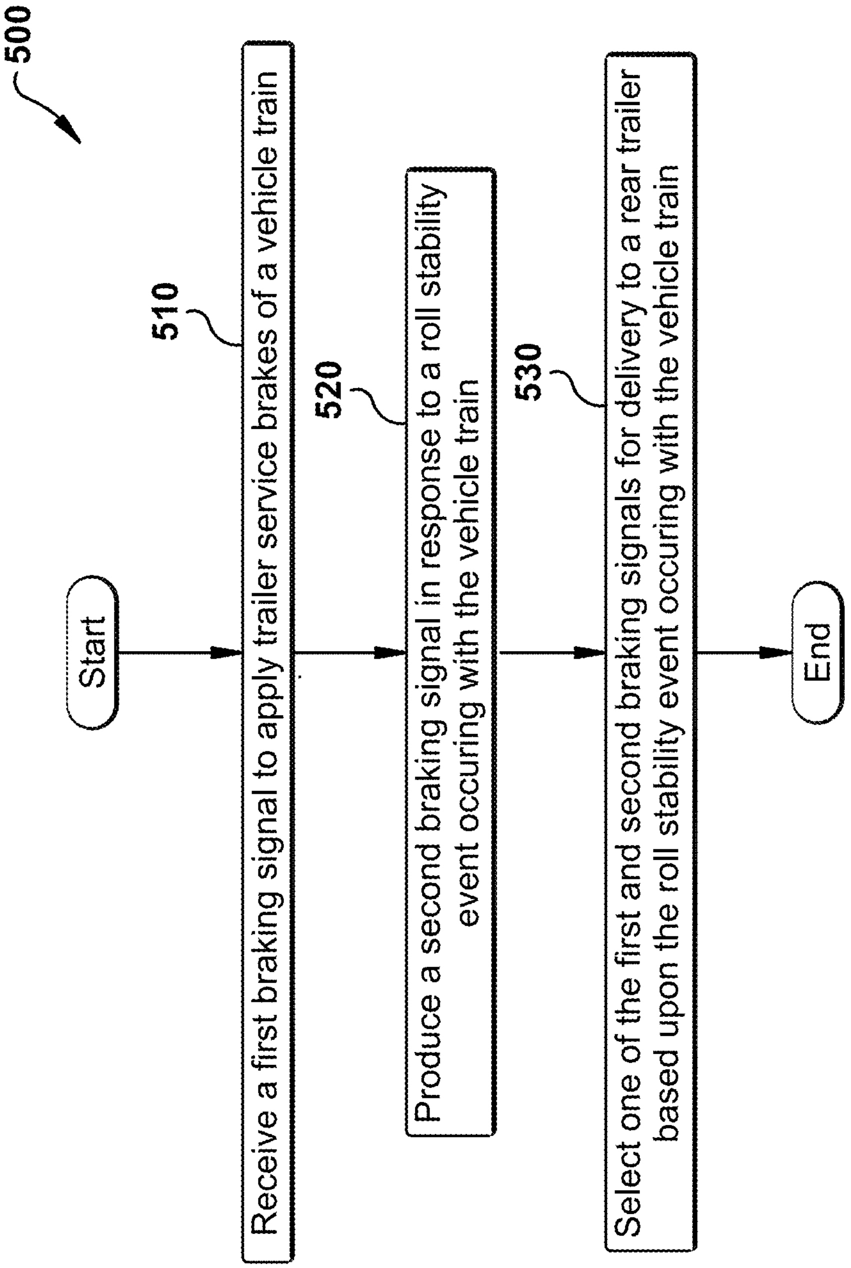
FIG. 5 is a flow diagram depicting a method of operating a trailer braking system in accordance with an embodiment.

Referring to FIG. 5, flow diagram 500 depicts a method of operating a trailer braking system of a lead trailer of a vehicle train having a rear trailer towed by the lead trailer. In block 510, a first braking signal to apply trailer service brakes of the vehicle train is received. The process proceeds to block 520 in which a second braking signal is produced in response to a roll stability event occurring with the vehicle train. Then in block 530, one of the first and second braking signals is selected for delivery to the rear trailer based upon the roll stability event occurring with the vehicle train. The process then ends.

In some embodiments, at least one roll stability braking signal is produced in response to the roll stability event.

In some embodiments, a left-roll stability braking signal and a right-roll stability braking signal are produced in response to the roll stability event. In some embodiments, the selected one of the first braking signal, the left-roll stability braking signal, and the right-roll stability braking signal is delivered to the rear trailer. In some embodiments, the one of the first and second braking signals is selected for delivery to the rear trailer based upon a roll stability event occurring with the lead trailer of the vehicle train.

In some embodiments, a pressurized air reservoir is connected to provide the second braking signal in response to the roll stability event. In some embodiments, the selected one of the first braking signal and the second braking signal is delivered to the rear trailer. In some embodiments, pressure from the pressurized air reservoir is reduced to provide the second braking signal.

In some embodiments, the method is performed by a controller having a memory executing one or more programs of instructions which are tangibly embodied in a program storage medium readable by the controller.

A number of advantages result by providing a lead trailer of a vehicle train (e.g., the lead trailer 111 of the vehicle train 101 shown in FIG. 2) with the above-described trailer brake control apparatuses 215, 315, 415. One advantage is that an improved braking signal is provided to one or more rear trailers (including converter dollies) of the vehicle train 101.

The improved braking signal to the one or more rear trailers is selected from an applied trailer service braking signal from the vehicle driver and at least one braking signal provided by a trailer controller. The result is improved overall braking performance of the vehicle train 101.

Program instructions for enabling trailer controllers 280, 380, 480 of FIGS. 2A, 3A, 4A to perform operation steps in accordance with flow diagram 500 of FIG. 5 may be embedded in memory internal to the respective trailer controller. Alternatively, or in addition to, program instructions may be stored in memory external to each respective controller. As an example, program instructions may be stored in memory internal to a different controller of the vehicle. Program instructions may be stored on any type of program storage media including, but not limited to, external hard drives, flash drives, and compact discs. Program instructions may be reprogrammed depending upon features of the particular controller.

Aspects of disclosed embodiments may be implemented in software, hardware, firmware, or a combination thereof. The various elements of the system, either individually or in combination, may be implemented as a computer program product tangibly embodied in a machine-readable storage device for execution by a processor. Various steps of embodiments may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed embodiments can be loaded onto a computer.

Although the above description describes use of only one controller, it is conceivable that any number of controllers may be used. Moreover, it is conceivable that any type of controller may be used. Suitable controllers for use in vehicles are known and, therefore, have not been described. Accordingly, the program instructions of the present disclosure can be stored on program storage media associated with one or more vehicle controllers.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A trailer brake control apparatus for enabling a lead trailer of a vehicle train to provide a selected pneumatic braking signal for delivery to a rear trailer of the vehicle train, the trailer brake control apparatus comprising:

a number of pneumatic devices arranged to select one of a plurality of pneumatic braking signals; and a trailer braking controller arranged to (i) receive a first pneumatic braking signal from a tractor of the vehicle train to apply trailer service brakes of the vehicle train, (ii) produce a second pneumatic braking signal based upon roll stability activation, and (iii) control the number of pneumatic devices in response to the roll stability activation to select either the first pneumatic braking signal or the second pneumatic braking signal for delivery to the rear trailer of the vehicle train.

2. A trailer brake control apparatus according to claim 1, wherein the number of pneumatic devices includes a pair of shuttle valves cooperating together to select the one of the first pneumatic braking signal and the second pneumatic braking signal to be delivered to the rear trailer of the vehicle train.

3. A trailer brake control apparatus according to claim 1, wherein the number of pneumatic devices includes a shuttle valve and a solenoid cooperating together to select the one of the first pneumatic braking signal and the second pneumatic braking signal to be delivered to the rear trailer of the vehicle train.

4. A trailer brake control apparatus according to claim 1, wherein the number of pneumatic devices includes a pair of solenoids cooperating together to select the one of the first pneumatic braking signal and second pneumatic braking signal to be delivered to the rear trailer of the vehicle train.

5. A trailer brake control apparatus for enabling a lead trailer of a vehicle train to provide a selected pneumatic braking signal for delivery to a rear trailer of the vehicle train, the trailer brake control apparatus comprising:

a number of pneumatic devices arranged to select one of a plurality of pneumatic braking signals; and a trailer braking controller arranged to (i) receive an applied pneumatic braking signal from a tractor of the vehicle train to apply trailer service brakes of the vehicle train, (ii) produce a left-roll stability pneumatic braking signal and a right-roll stability pneumatic braking signal based upon the applied pneumatic braking signal received, and (iii) control the number of pneumatic devices in response to a roll stability event occurring to select one of the applied pneumatic braking signal, the left-roll stability pneumatic braking signal, and the right-roll stability pneumatic braking signal for delivery to the rear trailer of the vehicle train.

6. A trailer brake control apparatus according to claim 5, wherein the number of pneumatic devices includes a pair of shuttle valves cooperating together to select the one of the applied pneumatic braking signal, the left-roll stability pneumatic braking signal, and the right-roll stability pneumatic braking signal to be delivered to the rear trailer of the vehicle train.

7. A trailer brake control apparatus according to claim 6, wherein one of the pair of shuttle valves is pneumatically connected between the left-roll stability pneumatic braking signal and the right-roll stability pneumatic braking signal, and the other one of the pair of shuttle valves is pneumatically connected between the one of the pair of shuttle valves and the applied pneumatic braking signal.

8. A trailer brake control apparatus according to claim 7 further comprising:

a pressure-reducing valve disposed in a pneumatic line that interconnects the pair of shuttle valves.

9. A trailer brake control apparatus according to claim 5, wherein the number of pneumatic devices includes a shuttle valve and a solenoid cooperating together to select one of the applied pneumatic braking signal, the left-roll stability pneumatic braking signal, and the right-roll stability pneumatic braking signal to be delivered to the rear trailer of the vehicle train.

10. A trailer brake control apparatus according to claim 9, wherein the shuttle valve is pneumatically connected between the solenoid and the applied pneumatic braking signal, and the solenoid is pneumatically connected between the shuttle valve and a reservoir of pressurized air.

11. A trailer brake control apparatus according to claim 10 further comprising:

a pressure-reducing valve disposed in a pneumatic line that interconnects the solenoid and the shuttle valve.

12. A trailer brake control apparatus according to claim 5, wherein the number of pneumatic devices includes a pair of solenoids cooperating together to select the one of the applied pneumatic braking signal, the left-roll stability pneumatic braking signal and the right-roll stability pneumatic braking signal to be delivered to the rear trailer of the vehicle train.

13. A trailer brake control apparatus according to claim 12, wherein one of the pair of solenoids is pneumatically connected between a reservoir of pressurized air and the other one of the pair of solenoids, and the other one of the pair of solenoids is pneumatically connected between the one of the pair of solenoids and the applied pneumatic braking signal.

14. A trailer brake control apparatus according to claim 13 further comprising:

a pressure-reducing valve disposed in a pneumatic line that interconnects the pair of solenoids.

15. A method of operating a trailer braking system of a lead trailer of a vehicle train having a rear trailer towed by the lead trailer, the method comprising:

receiving a first pneumatic braking signal from a tractor of the vehicle train to apply trailer service brakes of the vehicle train;

producing a second pneumatic braking signal in response to a roll stability event occurring with the vehicle train; and selecting one of the first and second pneumatic braking signals for delivery to the rear trailer based upon the roll stability event occurring with the vehicle train.

16. A method according to claim 15, wherein producing a second braking signal in response to the roll stability event includes:

producing at least one roll stability braking signal in response to the roll stability event.

17. A method according to claim 16, wherein producing at least one roll stability braking signal in response to the roll stability event includes:

producing a left-roll stability pneumatic braking signal and a right-roll stability pneumatic braking signal in response to the roll stability event.

18. A method according to claim 17 further comprising:

delivering the selected one of the first pneumatic braking signal, the left-roll stability pneumatic braking signal, and the right-roll stability pneumatic braking signal to the rear trailer.

19. A method according to claim 15, wherein producing a second pneumatic braking signal in response to the roll stability event includes:

connecting to a pressurized air reservoir to provide the second pneumatic braking signal in response to the roll stability event.

20. A method according to claim 19 further comprising:

delivering the selected one of the first pneumatic braking signal and the second pneumatic braking signal to the rear trailer.

21. A method according to claim 19 further comprising:

reducing pressure from the pressurized air reservoir to provide the second pneumatic braking signal.

22. A method according to claim 15, wherein selecting one of the first and second pneumatic braking signals for delivery to the rear trailer based upon the roll stability event occurring with the vehicle train includes:

selecting one of the first and second pneumatic braking signals for delivery to the rear trailer based upon a roll stability event occurring with the lead trailer of the vehicle train.

23. A method according to claim 15, wherein the method is performed by a controller having a memory executing one or more programs of instructions which are tangibly embodied in a program storage medium readable by the controller.

* * * * *